US008168916B2

(12) United States Patent
Hussary et al.

(10) Patent No.: US 8,168,916 B2
(45) Date of Patent: May 1, 2012

(54) ENHANCED PIERCING THROUGH CURRENT PROFILING

(75) Inventors: Nakhleh Hussary, Lebanon, NH (US); Thierry Renault, Enfield, NH (US); Christopher Conway, Wilmot, NH (US)

(73) Assignee: Thermal Dynamics Corporation, West Lebanon, NH (US)

( * ) Notice: Subject to any disclaimer, the term of this patent is extended or adjusted under 35 U.S.C. 154(b) by 945 days.

(21) Appl. No.: 12/180,960

(22) Filed: Jul. 28, 2008

(65) Prior Publication Data

US 2010/0018954 A1 Jan. 28, 2010

(51) Int. Cl.
*B23K 10/00* (2006.01)

(52) U.S. Cl. ......... 219/121.44; 219/121.39; 219/121.46; 219/121.59

(58) Field of Classification Search ............. 219/121.39, 219/121.46, 121.44, 121.59, 121.48, 75
See application file for complete search history.

(56) References Cited

U.S. PATENT DOCUMENTS 4,568,814 A * 2/1986 Hamasaki et al. ....... 219/121.68
5,120,930 A 6/1992 Sanders
5,132,512 A 7/1992 Sanders
5,208,448 A 5/1993 Everett
5,218,181 A 6/1993 Shintani
5,396,043 A 3/1995 Couch
5,614,110 A 3/1997 Shintan
5,695,662 A 12/1997 Couch
5,801,355 A 9/1998 Saio
6,209,723 B1 4/2001 Fields
6,359,251 B1 3/2002 Picard
6,900,408 B2 5/2005 Picard
6,914,209 B2 7/2005 Yamaguchi
6,947,802 B2 * 9/2005 Picard et al. .................. 700/117
2008/0210670 A1 * 9/2008 Brandt et al. ............ 219/121.55

OTHER PUBLICATIONS

*Nemchinksy, V.A., W.S. Severance and M.S. Showalter. Piercing of a metal slab by a plasma jet during plasma arc cutting. J. Phys. D*: Appl. Phys., V32, pp. 1364-1369, 1999.

* cited by examiner

*Primary Examiner* — Mark Paschall
(74) *Attorney, Agent, or Firm* — Brinks Hofer Gilson & Lione

(57) ABSTRACT

In general, the present invention provides a method of piercing a workpiece with a plasma arc torch of the type having a plasma gas flow path for directing a plasma gas through the torch and a secondary gas flow path for directing a secondary gas through the torch. The method comprises directing a flow of shield gas along a distal end portion of the plasma arc torch to deflect metal spatter generated from the piercing, and ramping a current provided to the plasma arc torch along a profile during piercing and controlling current ramp parameters as a function of a thickness of the workpiece and an operating current level, wherein the current ramp parameters comprise a length of time, a ramp rate, a shape factor, and a modulation.

27 Claims, 9 Drawing Sheets

ENHANCED PIERCING THROUGH CURRENT PROFILING

FIELD

The present disclosure relates generally to plasma arc torches and more particularly to methods for improving piercing operations.

BACKGROUND

The statements in this section merely provide background information related to the present disclosure and may not constitute prior art.

Plasma arc torches, also known as electric arc torches, are commonly used for cutting, marking, gouging, and welding metal workpieces by directing a high energy plasma stream consisting of ionized gas particles toward the workpiece. In a typical plasma arc torch, the gas to be ionized is supplied to a distal end of the torch and flows past an electrode before exiting through an orifice in the tip, or nozzle, of the plasma arc torch. The electrode has a relatively negative potential and operates as a cathode. Conversely, the torch tip constitutes a relatively positive potential and operates as an anode during piloting. Further, the electrode is in a spaced relationship with the tip, thereby creating a gap, at the distal end of the torch. In operation, a pilot arc is created in the gap between the electrode and the tip, often referred to as the plasma arc chamber, wherein the pilot arc heats and subsequently ionizes the gas. The ionized gas is blown out of the torch and appears as a plasma stream that extends distally off the tip. As the distal end of the torch is moved to a position close to the workpiece, the arc jumps or transfers from the torch tip to the workpiece with the aid of a switching circuit activated by the power supply. Accordingly, the workpiece serves as the anode, and the plasma arc torch is operated in a "transferred arc" mode.

In one mode of operation, commonly referred to as "piercing," the plasma arc torch is started at a location on the workpiece rather than on an edge of the workpiece to start a cut. Piercing becomes more difficult as the workpiece thickness increases, and in general, piercing workpieces that are thicker than about one inch is often challenging. Additionally, piercing thinner workpieces at lower current levels can prove to be difficult as well. With thinner workpieces, the pierce time is relatively short and the arc has a tendency to stretch as material is removed rather quickly. The stretched arc can cause damage to components of the plasma arc torch, such as the tip, and can also cause an over voltage condition such that the power supply cannot deliver the requisite amount of power. Moreover, during piercing operations, molten metal, or slag, has a tendency to splatter onto components of the plasma arc torch and reduce their effectiveness and overall useful life. Therefore, significant efforts are undertaken to design proper gas shielding to protect the plasma arc torch and its components from molten slag during piercing.

During piercing, the plasma arc creates a semi-ellipsoid shape in the workpiece, and molten metal travels away from the pierce location, taking on multiple trajectories and spanning radially and azimuthally. In order to deflect the molten metal away from the plasma arc torch and its components, and also to cool the molten metal such that it has less of a tendency to adhere to components of the plasma arc torch, shield gases are employed to exert a proper deflection force and for cooling. Compared to controlling current, the type and amount of shield gas is often difficult to control in order to effect proper deflection/cooling of the molten metal, and thus improved methods of piercing are continuously being pursued in the art of plasma arc cutting.

SUMMARY

In general, the present disclosure provides an innovative plasma arc torch and methods to deflect metal spatter away from the plasma arc torch and its components during piercing operations. In general, the methods involve optimizing a current profile as a function of workpiece thickness in order to more efficiently deflect metal spatter away from the plasma arc torch and its components. Various forms of current profiles are employed, which are further a function of an operating current level in other forms of the present disclosure. The current profiling is used in combination with shield gases to exert a proper deflection force to the metal spatter, which is described in greater detail below. In general, an effective deflection will depend on the ratio of momentum of the shield gas available to that of the metal spatter.

In one form, the present disclosure provides a method of piercing a workpiece with a plasma arc torch of the type having a plasma gas flow path for directing a plasma gas through the torch and a secondary gas flow path for directing a secondary gas through the torch. The method comprises directing a flow of shield gas along a distal end portion of the plasma arc torch to deflect metal spatter generated from the piercing, ramping a current provided to the plasma arc torch along a profile during piercing and controlling current ramp parameters as a function of a thickness of the workpiece and an operating current level to reduce the impact of molten metal splatter during piercing, wherein the current ramp parameters comprise a length of time, a ramp rate, a shape factor, and a modulation.

In another form of the present disclosure, a method of piercing a workpiece with a plasma arc torch of the type having a plasma gas flow path for directing a plasma gas through the torch and a secondary gas flow path for directing a secondary gas through the torch is provided. The method comprises directing a flow of shield gas along a distal end portion of the plasma arc torch to deflect metal spatter generated from the piercing, ramping a current provided to the plasma arc torch along a profile during piercing, and modulating the current profile as a function of a thickness of the workpiece and an operating current level to decrease the impact of molten metal splatter during piercing.

In yet another form of the present disclosure, a method of piercing a workpiece with a plasma arc torch of the type having a plasma gas flow path for directing a plasma gas through the torch and a secondary gas flow path for directing a secondary gas through the torch is provided. The method comprises directing a flow of shield gas along a distal end portion of the plasma arc torch to deflect metal spatter generated from the piercing, ramping a current provided to the plasma arc torch along a profile during piercing, and decreasing and increasing a slope of the current profile as a function of a thickness of the workpiece to reduce the impact of molten metal splatter during piercing.

The present disclosure also includes a plasma arc torch of the type having a plasma gas flow path for directing a plasma gas through the torch and a secondary gas flow path for directing a secondary gas through the torch. The plasma arc torch comprises a piercing current that flows through a tip extending from a distal end portion of the torch. The piercing is controlled along a profile during piercing and is controlled by current ramp parameters as a function of a thickness of a workpiece and an operating current level to increase the effectiveness of a shield gas in deflecting metal splatter during piercing. In this form, the current ramp parameters comprise a length of time, a ramp rate, a shape factor, and a modulation.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

In order that the disclosure may be well understood, there will now be described various forms thereof, given by way of example, reference being made to the accompanying drawing, in which.

Figure 6:
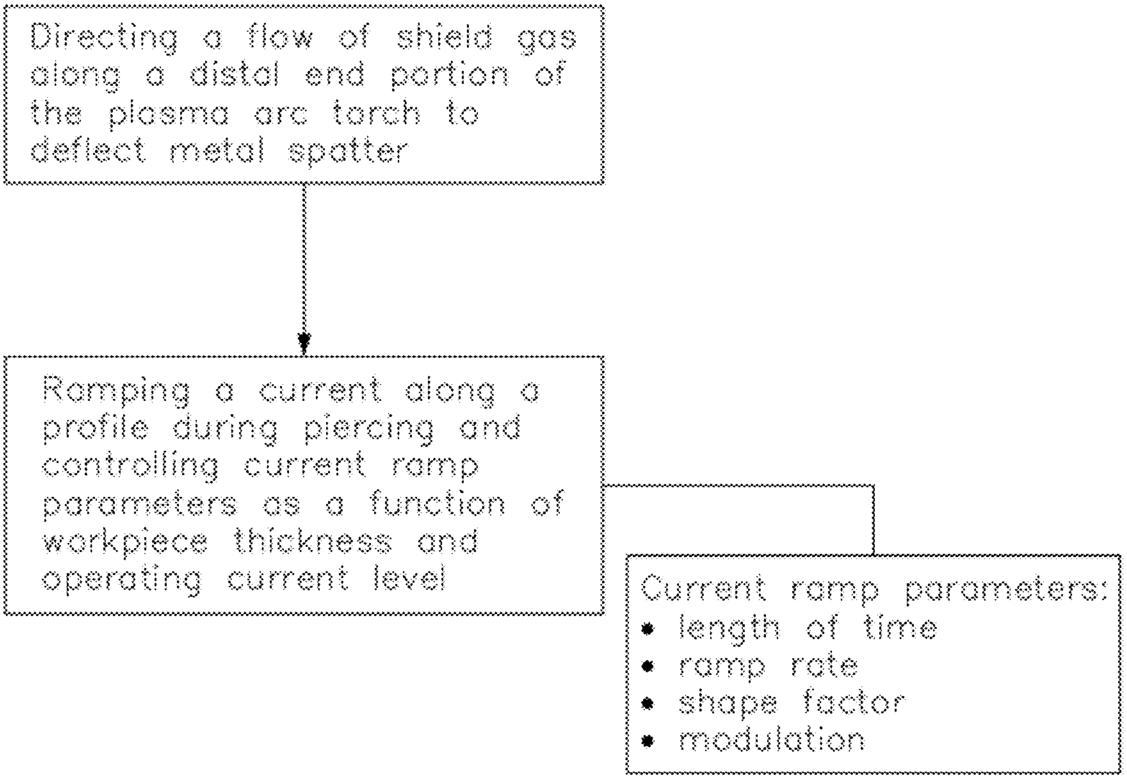
Figure 7:
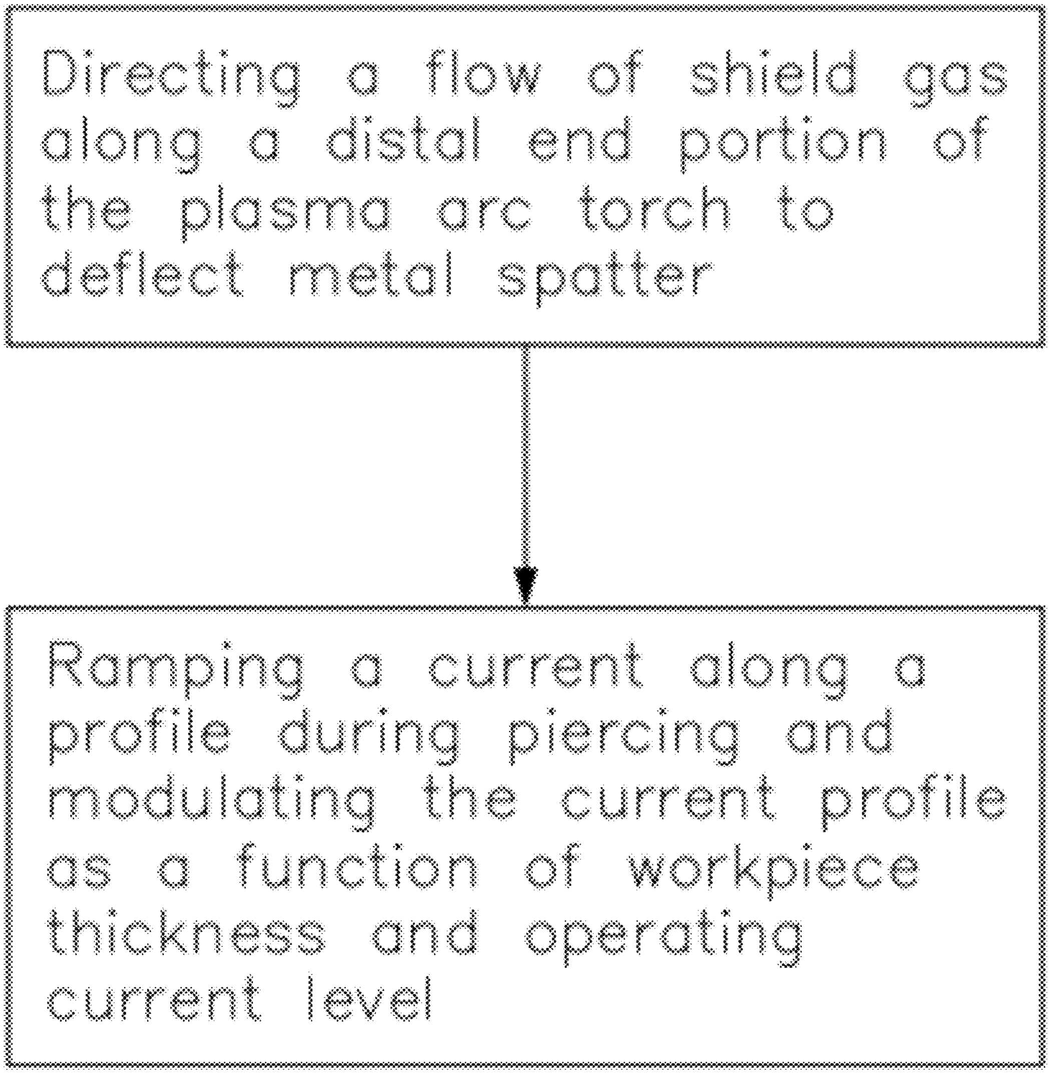
Figure 8:
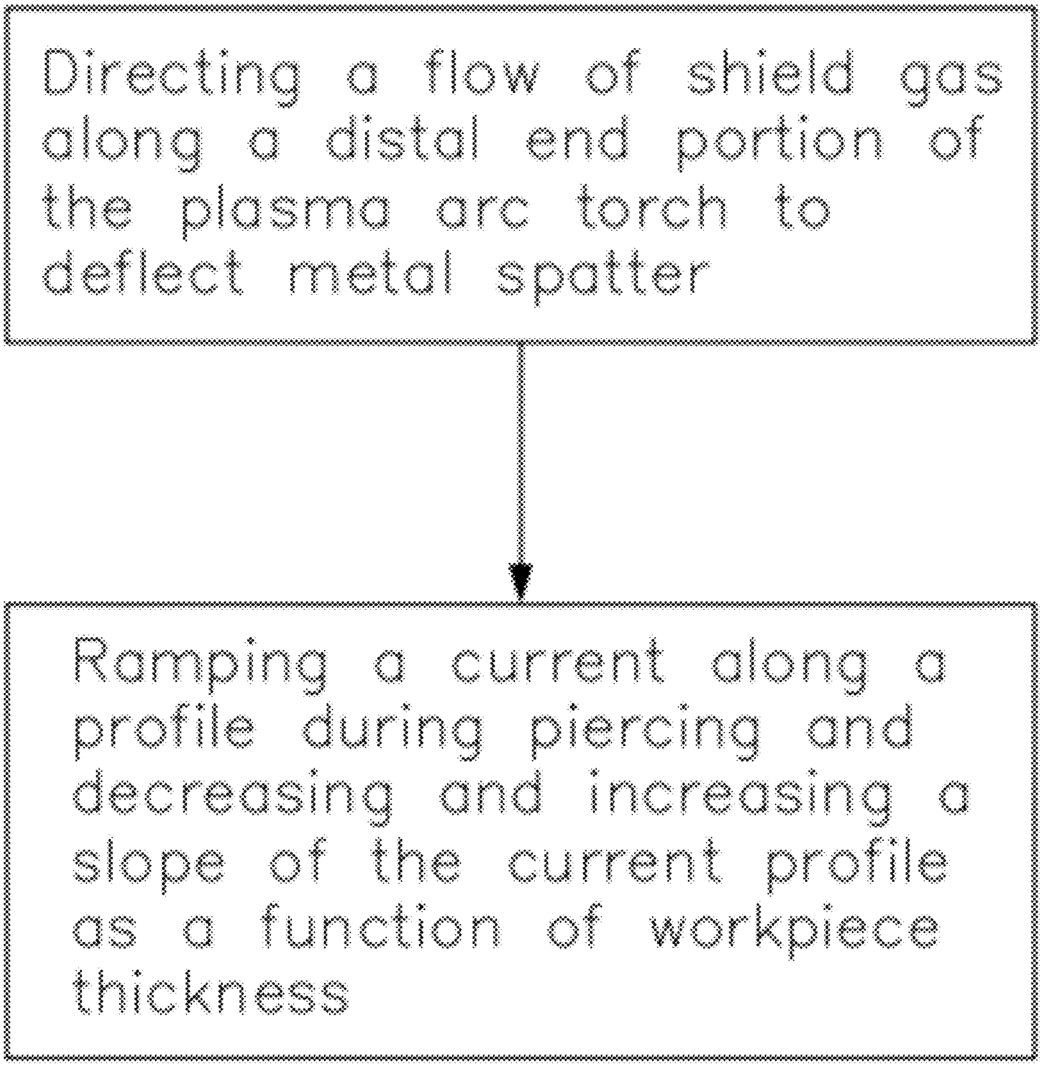
Figure 9:
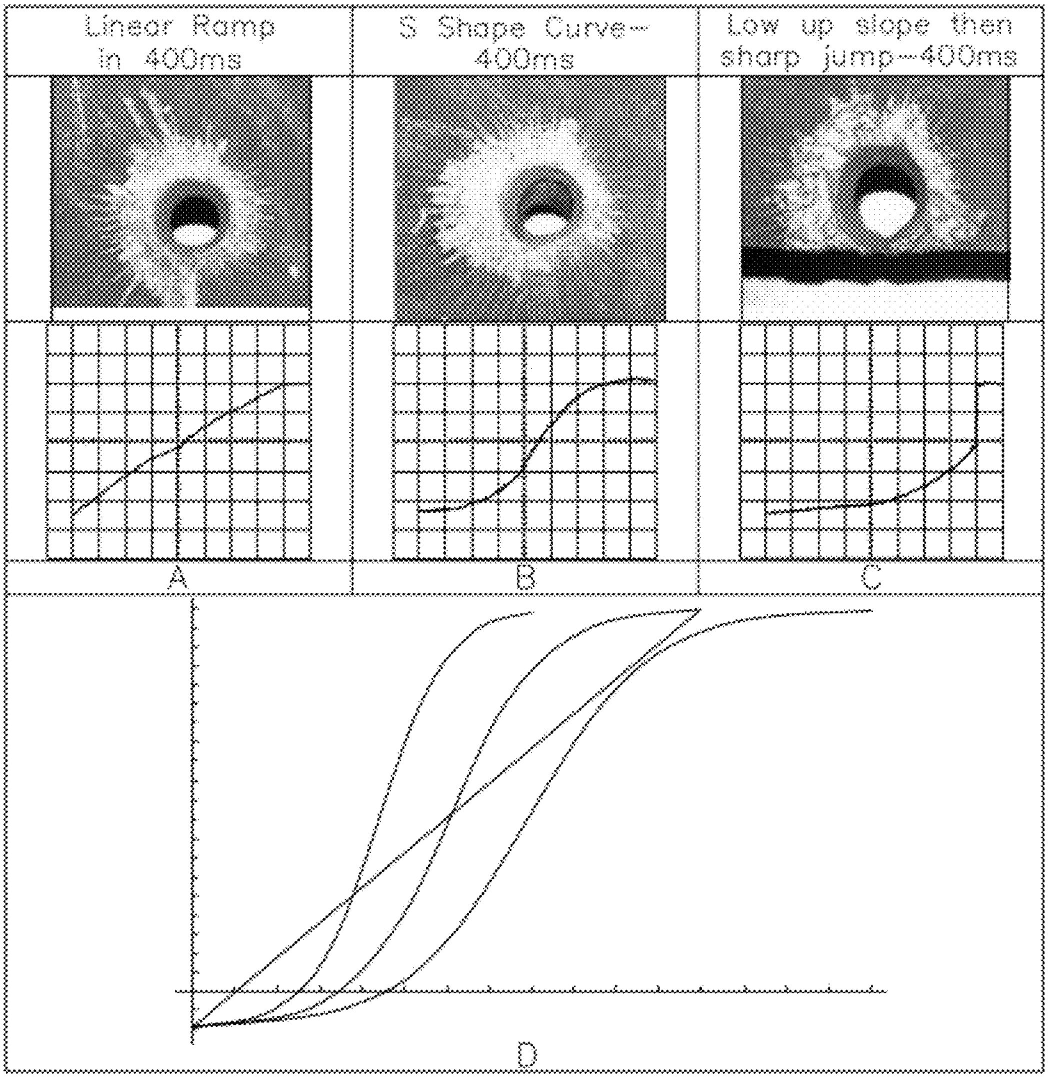

FIGS. 5*a*-5*i* are exemplary shape factors for current ramp parameters in accordance with the principles of the present disclosure;

FIG. 6 is a flow diagram illustrating an exemplary method of piercing a workpiece in accordance with the principles of the present disclosure;

FIG. 7 is a flow diagram illustrating another exemplary method of piercing a workpiece in accordance with the principles of the present disclosure;

FIG. 8 is a flow diagram illustrating yet another exemplary method of piercing a workpiece in accordance with the principles of the present disclosure; and FIG. 9 is a table illustrating sample testing of piercing a workpiece of a given thickness at a given amperage over a variety of current profiles in accordance with the principles of the present disclosure;

Corresponding reference numerals indicate corresponding parts throughout the several views of the drawings.

DETAILED DESCRIPTION

The following description is merely exemplary in nature and is not intended to limit the present disclosure, application, or uses.

Figure 1:
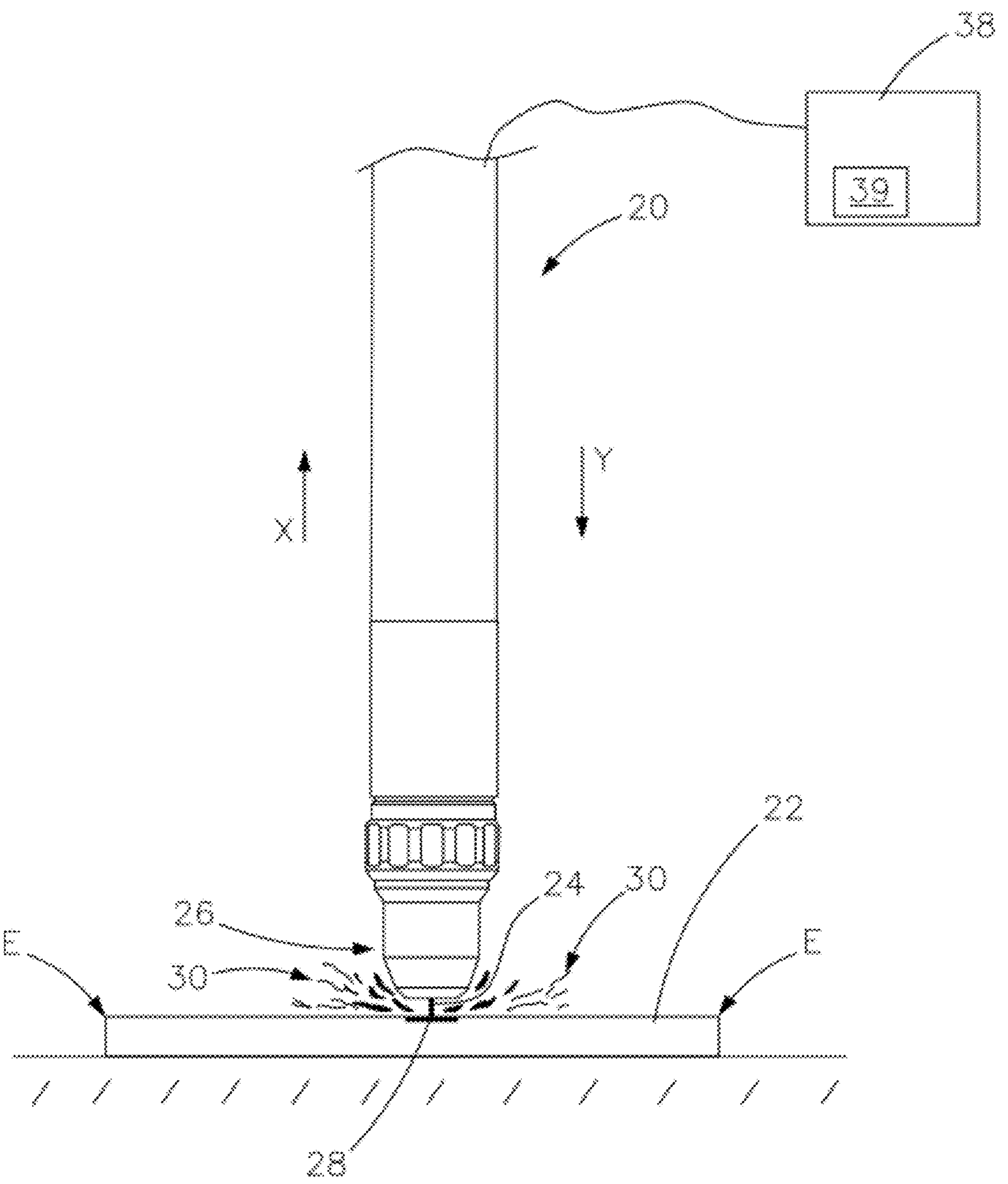
FIG. 1 is a side view of a plasma arc torch in a piercing mode and constructed in accordance with the principles of the present disclosure.

Referring to FIG. 1, a plasma arc torch operating in a piercing mode is illustrated and generally indicated by reference numeral 20. As shown, the plasma arc torch 20 is positioned away from the edges "E" of a workpiece 22, hence being operated in a piercing mode. Once a plasma arc 24 is transferred from a distal end portion 26 of the plasma arc torch 20 to the workpiece 22, current provided to the plasma arc torch 20 is increased, and the piercing operation begins. As previously set forth, the plasma arc 24 creates a semi-ellipsoid shape 28 in the workpiece 22, and metal spatter 30 travels away from the pierce location, taking on multiple trajectories and spanning radially and azimuthally. In order to deflect the metal spatter 30 away from the distal end portion 26 of the plasma arc torch 20 and its components, shield gases are employed to exert a proper deflection force, which is described in greater detail below. In general, an effective deflection will depend on the ratio of momentum of the shield gas available to that of the metal spatter 30.

As used herein, a plasma arc torch, whether operated manually or automated, should be construed by those skilled in the art to be an apparatus that generates or uses plasma for cutting, welding, spraying, gouging, or marking operations, among others. Accordingly, the specific reference to plasma arc cutting torches, plasma arc torches, or automated plasma arc torches herein should not be construed as limiting the scope of the present disclosure. Furthermore, the specific reference to providing gas to a plasma arc torch should not be construed as limiting the scope of the present invention, such that other fluids, e.g. liquids, may also be provided to the plasma arc torch in accordance with the teachings of the present invention. Additionally, as used herein, the words "proximal direction" or "proximally" is the direction as depicted by arrow X, and the words "distal direction" or "distally" is the direction as depicted by arrow Y.

Figure 2:
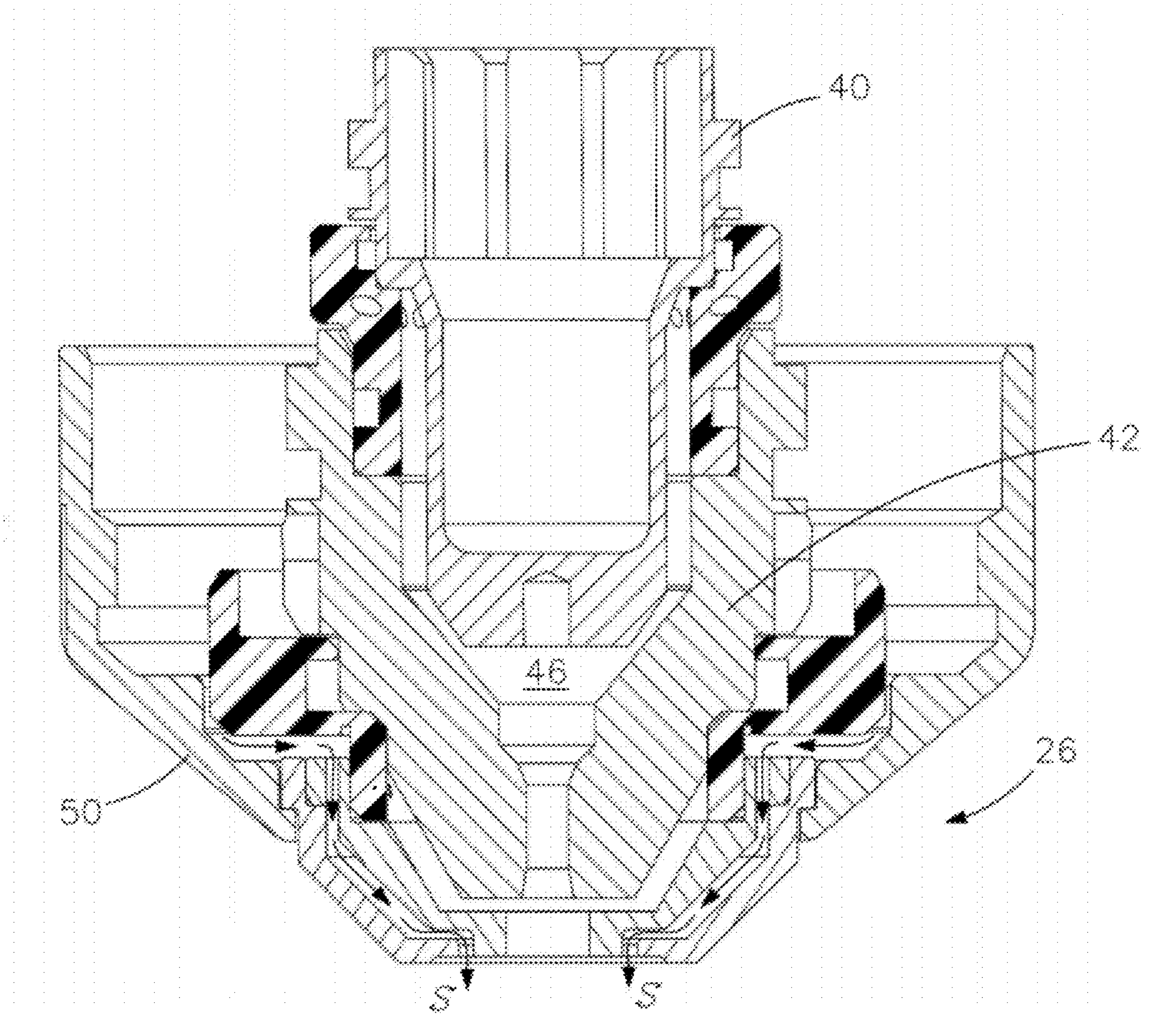
FIG. 2 is an enlarged side cross-sectional view of a distal end portion of a plasma arc torch and its consumable components constructed in accordance with the principles of the present disclosure.

Referring now to FIG. 2, the distal end portion 26 of the plasma arc torch 20 is illustrated in greater detail, wherein the shield gas "S" is employed to deflect and cool the molten metal during piercing. The distal end portion 26 of the plasma arc torch 20 includes various consumable components, including by way of example, an electrode 40 and a tip 42, which are separated by a gas distributor 44 to form a plasma arc chamber 46. The electrode 40 is adapted for electrical connection to a cathodic, or negative, side of a power supply (not shown), and the tip 42 is adapted for electrical connection to an anodic, or positive, side of a power supply during piloting. As power is supplied to the plasma arc torch 20, a pilot arc is created in the plasma arc chamber 46, which heats and subsequently ionizes a plasma gas that is directed into the plasma arc chamber 46 through the gas distributor 44. The ionized gas is blown out of the plasma arc torch and appears as a plasma stream that extends distally off the tip 42. A more detailed description of additional components and overall operation of the plasma arc torch 20 is provided by way of example in U.S. Pat. No. 7,019,254 titled "Plasma Arc Torch," and its related applications, which are commonly assigned with the present disclosure and the contents of which are incorporated herein by reference in their entirety.

The consumable components also include a shield device 50 that is positioned distally from the tip 42 and which is isolated from the power supply. The shield device 50 functions to shield the tip 42 and other components of the plasma arc torch 20 from molten splatter during piercing and also from heat flux emanating from the workpiece, in addition to directing the flow of shield gas S that is used to deflect molten splatter and to stabilize and control the plasma stream. Additionally, the gas directed by the shield device 50 provides additional cooling for the consumable components of the plasma arc torch 20.

In general, the present disclosure sets forth methods by which the shield design and energy input to the pierce location are closely coupled in order to effect an improved piercing operation. More specifically, the present disclosure provides control of energy input to the pierce location through control of a current profile during piercing. Such control allows for the use of one particular pierce profile optimized for a current level and shield design across a range of material thicknesses and also optimization of current profile for a particular thickness. This in fact becomes particularly useful with automated plasma cutting systems.

Figure 3:
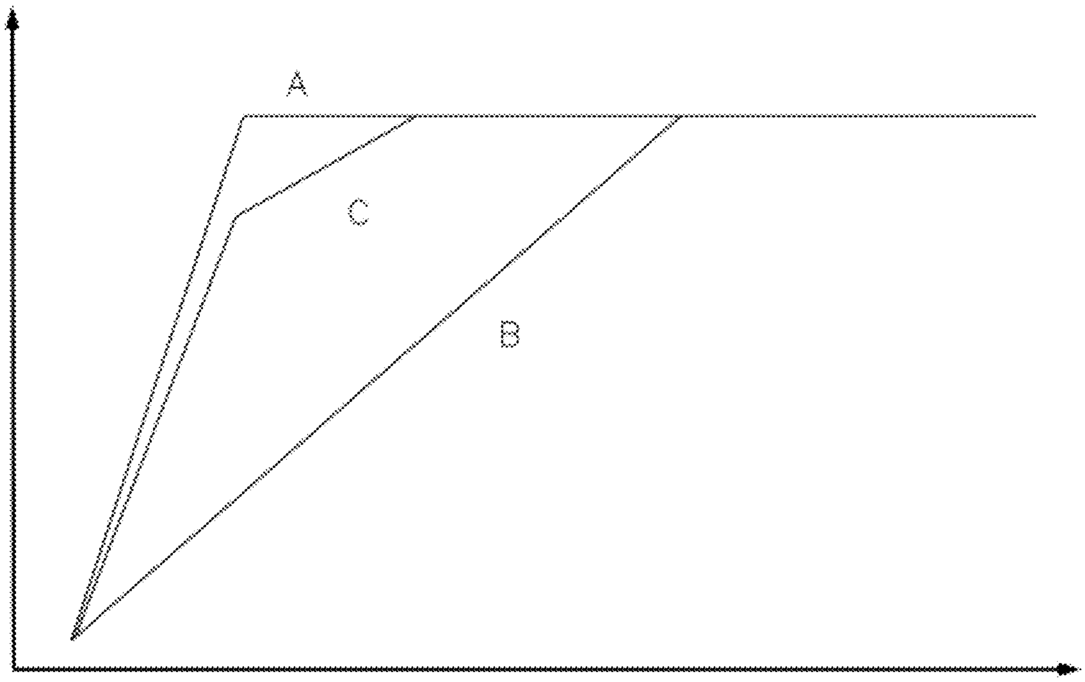
FIG. 3 is a graph illustrating exemplary current profiles in accordance with the principles of the present disclosure.

With reference to FIG. 3, in accordance with the principles of the present disclosure, for a given amount of available gas momentum, the amount of the melting and ejection of the metal is controlled by controlling the current profile during the piercing. Generally, a steep current profile A will generate too much molten material for the available gas momentum resulting in metal depositing on the shield. Likewise, a relatively shallow current profile B will result in an inefficient and stagnating piercing process. As the pierce location becomes deeper, the trajectories of the ejected metal tend to become more vertical (ejected vertically toward the plasma arc torch 20). Therefore, a decrease in the slope C of the current at deeper pierce locations will increase the effectiveness of deflection of the shielding gas.

Figure 4:
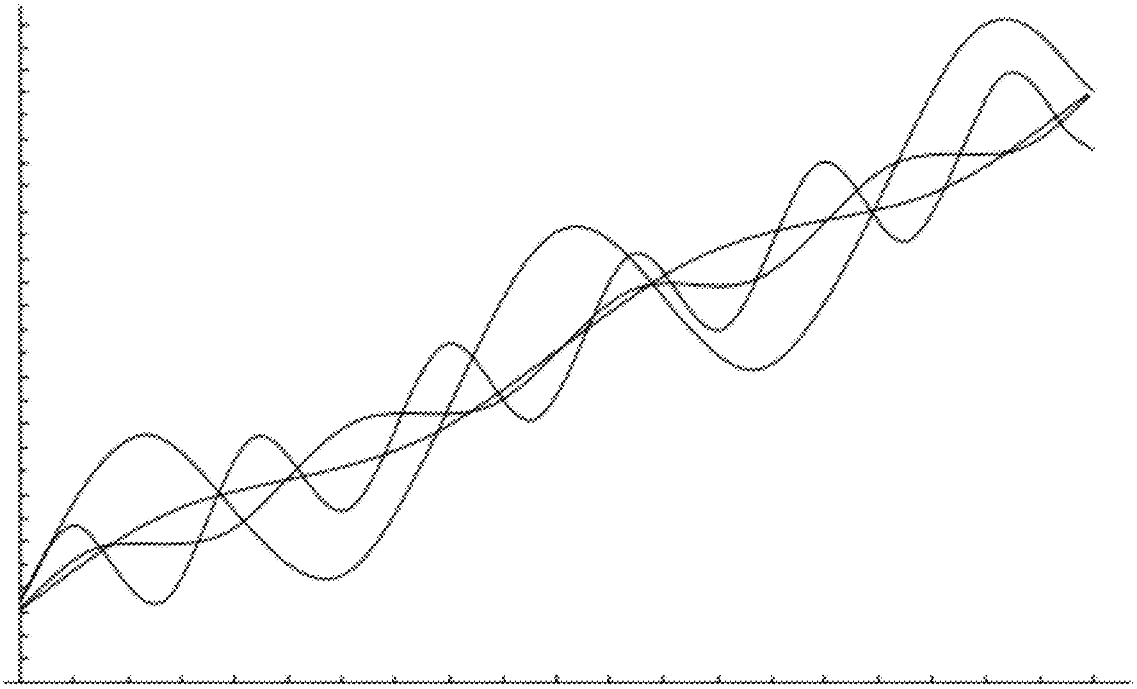
FIG. 4 is a graph illustrating a modulated current profile in accordance with the principles of the present disclosure.

An increase in the capacity of pierce will depend on the effectiveness of pushing the molten metal at the bottom of the well. Referring to FIG. 4, the pierce capacity can be enhanced by modulating the current during piercing. As used herein, the term "modulating" or "modulation" shall be construed to mean a modification of the current profile over a time period. In other words, modulation of the current profile is essentially superimposing a nonlinear shape form onto a linear profile to vary the current in a meaningful way over a period of time. By way of example, modulation of the current profile generally includes such methods as:

1) Amplitude modulation—varying the magnitude of the current profile over time;

2) Frequency modulation—varying the frequency of the current waveform over time;

3) Phase modulation—delaying the natural flow of the current profile;

4) Pulse modulation—pulsing current level during profiling;

5) Phase Shift Keying—the phase of the current profile is varied to tailor the energy delivered during piercing; and 6) Multi-Modulation—combining two or more of the above current signals into the current profile.

More specifically, in accordance with the specific forms of the present disclosure, a sinusoidal wave superimposed with a linear ramp as shown in FIG. 4 results in modulation of the heat available to melt the metal as well as the plasma pressure on the molten metal. The amplitude of the sinusoidal wave (or simplified segmented representation of such a wave) as well as the rate of linear increase, as an example, will determine the rate of metal melting and subsequent deflection by the shielding gas.

Certain current ramp parameters are controlled in order to effect more efficient piercing in accordance with the principles of the present disclosure. These current ramp parameters include, by way of example:

1) Length of ramp up time;

2) Ramp rate;

3) Shape factor of the current ramp (described in greater detail below); and

3) Modulation of the current ramp.

Figure 5A:
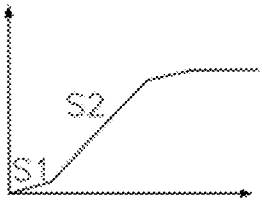
Figure 5B:
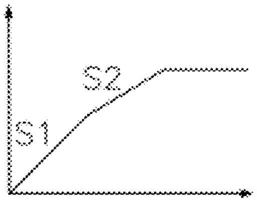
Figure 5C:
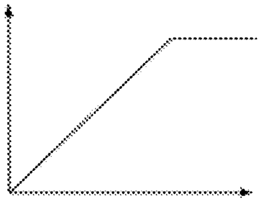
Figure 5D:
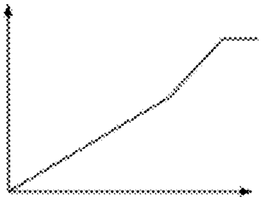
Figure 5E:
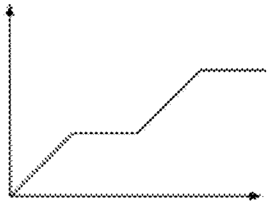
Figure 5F:
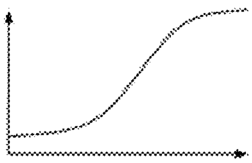
Figure 5G:
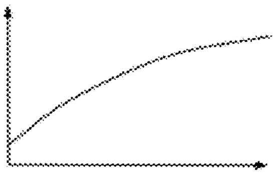
Figure 5H:
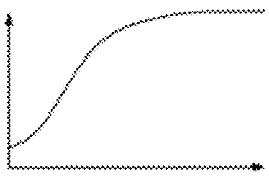
Figure 5I:
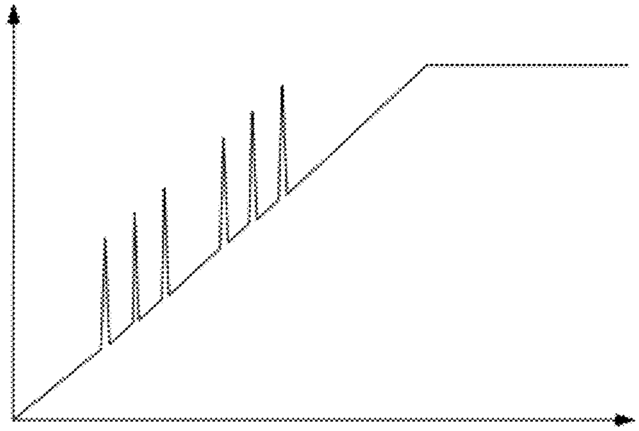

With reference to FIG. **5*a*-5*i*, exemplary shape factors are illustrated. FIG. 5*a* represents a shape factor having a slope S1 followed by a slope S2, wherein the slope S2 is steeper than the slope S1; FIG. 5*b* represents a linear shape factor with the slope S2 shallower than the slope S1; FIG. 5*c* illustrates a linear shape factor; FIG. 5*d* illustrates a shape factor having a slope S1 followed by a slope S2, wherein the slope S1 is shallower than the slope S2; FIG. 5*e* represents a stepped linear profile; FIG. 5*f* illustrates an S-curve shape factor; FIG. 5*g* illustrates a polynomial shape factor; FIG. 5*h* represents an exponential shape factor; and FIG. 5*i*** represents a pulsed current profile. Alternately, the shape factor could comprise a plurality of slopes with varying degrees of slope, at least one of the slopes could be modulated, all of the slopes could be modulated, or none of the slopes could be modulated. It should be understood that these shape factors and modulations, and combinations thereof, are merely exemplary and should not be construed as limiting the scope of the present disclosure.

In general, the current ramp parameters are adjusted for current level and thickness of the workpiece 22. For example, in accordance with various testing and analysis, it has been shown that a sharp increase in current will deposit metal spatter 30 on the plasma arc torch 20 and damage the shield device 50. In a similar fashion, a decrease of the slope, especially on thicker workpieces 22, produces a more controlled pierce with controlled trajectories of the metal spatter 30. In accordance with one form of the present disclosure, the slope of the current profile is decreased as a function of an increase in pierce location of the workpiece 22. With the sinusoidal modulations as shown in FIG. **5*i***, an amplitude of the sinusoidal wave is varied as a function of the workpiece thickness and the operating current level in another form of the present disclosure.

An exemplary method of piercing a workpiece 22 with a plasma arc torch 20 of the type having a plasma gas flow for directing a plasma gas through the torch and a secondary gas flow for directing a secondary gas through the torch is illustrated in FIG. 6. The method comprises: directing a flow of shield gas along a distal end portion 26 of the plasma arc torch 20 to deflect metal spatter generated from piercing; ramping a current provided to the plasma arc torch 20 along a profile during piercing; and controlling current ramp parameters as a function of a thickness of the workpiece and an operating current level to reduce the impact of molten metal splatter during piercing. The current ramp parameters comprise a length of time, a ramp rate, a shape factor, and a modulation.

Referring now to FIG. 7, another method of piercing a workpiece with a plasma arc torch of the type having a plasma gas flow path for directing a plasma gas through the torch and a secondary gas flow for directing a secondary gas through the torch is illustrated. The method comprises directing a flow of shield gas along a distal end portion of the plasma arc torch 20 to deflect metal spatter generated from the piercing; ramping a current provided to the plasma arc torch along a profile during piercing; and modulating the current profile as a function of a thickness of the workpiece and an operating current level to decrease the impact of molten metal splatter during piercing. The various modulations and shape factors, or profiles, as previously set forth may be employed with this method in accordance with the principles of the present disclosure.

With reference to FIG. 8, yet another method of piercing a workpiece with a plasma arc torch of the type having a plasma gas flow path for directing a plasma gas through the torch and a secondary gas flow for directing a secondary gas through the torch is illustrated. The method comprises directing a flow of shield gas along a distal end portion of the plasma arc torch to deflect metal spatter generated from the piercing; and ramping a current provided to the plasma arc torch along a profile during piercing and decreasing and increasing a slope of the current profile as a function of a thickness of the workpiece to reduce the impact of molten metal splatter during piercing. The various modulations and shape factors, or profiles, as previously set forth may be employed with this method in accordance with the principles of the present disclosure.

As further shown in FIG. 1, a control system 38 for the plasma arc torch 20 may be provided in accordance with the principles of the present disclosure. The control system 38 comprises a controller 39 that ramps a current provided to the torch along a profile during piercing and controls current ramp parameters as a function of a thickness of the workpiece and an operating current level to increase the effectiveness of the shield gas in deflecting metal splatter during piercing, wherein the current ramp parameters comprise a length of time, a ramp rate, a shape factor, and a modulation. In one form, an arc voltage signal is monitored and the controller changes the current profile based on the monitored voltage signal. As such, an algorithm is employed, rather than traditional look-up tables, thereby providing more efficient current profiling. It should be understood that the controller can monitor different types of signals other than the voltage while remaining within the scope of the present disclosure.

FIG. 9 shows the effect of the current slope during piercing on the shape of the pierce puddle for a given workpiece thickness (¾") and a given amperage (250 A). Note that a thick and evenly spread out molten metal pattern appears in (A) and (B) and a more closely and raised puddle appears in (C). Important to note is that the metal splatter on the torch was observed in (C) and to a lesser extent (A), with the best out of the three being (B). Furthermore, case (B) can be further optimized, especially on thicker materials 1.25" and above. Further investigation of the ramp profile on piercing of 1" and 1¼" thick MS between the S-shaped curve and the linear ramp (250 A current level) shows that linear ramp performed better with much less spatter reach the torch shield and the shield retainer. The investigation was limited to changes in the ramp up time which was varied between 400 ms and 800 ms, see (D). The linear ramp up of 600 ms showed even better results than the S-shaped curve at 800 ms. This can be explained by the steep slope of the S-shaped curve in the mid section, the amount of the material melted due to the steep slope (between 300 ms and 500 ms) is quite large and the shield gas moment is not as effective in deflecting it. It has also been observed that a 400 ms S-shape curve ramp is quite effective in protecting the shield device 50 and the plasma arc torch 20 torch when cutting with a 200 A current level, contrary to the case of the 250 A. This is explained by the arc current level not only supplying the energy to melt the material but also the momentum to remove the molten metal. The arc pressure on the molten metal puddle in the pierce well is higher in the case of the higher current parts and due to the increased mass flow rate of the plasma forming gas (note also that the cross sectional area of the 250 A orifice is 20% higher than the 200 A orifice). This results in higher momentum of the ejected metal droplets. These results lead to two conclusions: the rate of current increase and the final value of cutting current (which also dictates the parts design) are important parameters for properly optimizing the piercing.

In one form of the present disclosure, the workpiece thickness is about 1.50 inches (3.91 cm), and the length of time of the current ramp is between about 2 seconds and about 4 seconds. In another form, the workpiece thickness is between about 1.00 inches (2.54 cm) and about 1.25 inches (3.18 cm), the operating current level is about 250 amps, the length of time of the current ramp is between about 400 milliseconds and about 800 milliseconds, and the shape factor of the current profile is linear. In yet another form, the workpiece thickness is between about 1.00 inches (2.54 cm) and about 1.25 inches (3.18 cm), the operating current level is about 200 amps, the length of time of the current ramp is about 400 milliseconds, and the shape factor of the current profile is an S-curve.

The description of the invention is merely exemplary in nature and, thus, variations that do not depart from the substance of the present disclosure are intended to be within the scope of the invention. Such variations are not to be regarded as a departure from the spirit and scope of the present disclosure.

What is claimed is:

1. A method of piercing a workpiece with a plasma arc torch of the type having a plasma gas flow path for directing a plasma gas through the torch and a secondary gas flow path for directing a secondary gas through the torch, the method comprising:

directing a flow of shield gas along a distal end portion of the plasma arc torch to deflect metal spatter generated from the piercing;

ramping a current provided to the plasma arc torch along a profile during piercing by controlling at least one of current ramp parameters as a function of a thickness of the workpiece and an operating current level, wherein the current ramp parameters comprise a length of time, a ramp rate, a shape factor, and a modulation.

2. The method according to claim 1, wherein a slope of the current profile is decreased as a function of an increase in thickness of the workpiece.

3. The method according to claim 1, wherein the modulation comprises a sinusoidal wave.

4. The method according to claim 3, wherein the sinusoidal wave is superimposed with a linear profile.

5. The method according to claim 3, wherein an amplitude of the sinusoidal wave is varied as a function of the workpiece thickness and the operating current level.

6. The method according to claim 1, wherein the shape factor of the current profile is an S-curve.

7. The method according to claim 1, wherein the shape factor of the current profile is linear.

8. The method according to claim 1, wherein the shape factor comprises a plurality of slopes with varying degrees of slope.

9. The method according to claim 8, wherein at least one of the slopes is modulated.

10. The method according to claim 8, wherein none of the slopes are modulated.

11. The method according to claim 1, wherein the workpiece thickness is about 1.50 inches and the length of time of the current ramp is between about 2 seconds and about 4 seconds.

12. The method according to claim 1, wherein the workpiece thickness is between about 1.00 inches and about 1.25 inches, the operating current level is about 250 amps, the length of time of the current ramp is between about 400 milliseconds and about 800 milliseconds, and the shape factor of the current profile is linear.

13. The method according to claim 1, wherein the workpiece thickness is between about 1.00 inches and about 1.25 inches, the operating current level is about 200 amps, the length of time of the current ramp is about 400 milliseconds, and the shape factor of the current profile is an S-curve.

14. A plasma arc torch operated according to the method of claim 1.

15. A control system for a plasma arc torch operated according to the method of claim 1.

16. The method according to claim 15, wherein the current ramp parameters are controlled based on a monitored signal.

17. The method according to claim 16, wherein the signal is an arc voltage.

18. A method of piercing a workpiece with a plasma arc torch of the type having a plasma gas flow path for directing a plasma gas through the torch and a secondary gas flow path for directing a secondary gas through the torch, the method comprising:

directing a flow of shield gas along a distal end portion of the plasma arc torch to deflect metal spatter generated from the piercing;

ramping a current provided to the plasma arc torch along a profile during piercing by modulating the current profile as a function of a thickness of the workpiece and an operating current level to decrease the impact of molten metal splatter during piercing.

19. The method according to claim 18, wherein the modulation is selected from the group consisting of a sinusoidal wave, a triangle wave, a square wave, and a polynomial wave.

20. The method according to claim 19, wherein the sinusoidal wave is superimposed with at least one of the profiles of linear, an S-curve, and a plurality of slopes.

21. The method according to claim 19, wherein an amplitude of the sinusoidal wave is varied as a function of the workpiece thickness and the operating current level.

22. The method according to claim 18, wherein the modulation is applied to only a portion of the current profile.

23. A method of piercing a workpiece with a plasma arc torch of the type having a plasma gas flow path for directing a plasma gas through the torch and a secondary gas flow path for directing a secondary gas through the torch, the method comprising:

directing a flow of shield gas along a distal end portion of the plasma arc torch to deflect metal spatter generated from the piercing;

ramping a current provided to the plasma arc torch along a current profile during piercing by decreasing and increasing a slope of the current profile as a function of a thickness of the workpiece to reduce the impact of molten metal splatter during piercing.

24. The method according to claim 23, wherein the current profile is modulated.

25. The method according to claim 24, wherein the modulation is selected from the group consisting of a sinusoidal wave, a triangle wave, a square wave, and a polynomial wave.

26. The method according to claim 25, wherein the sinusoidal wave is superimposed with a linear profile.

27. The method according to claim 25, wherein an amplitude of the sinusoidal wave is varied as a function of the workpiece thickness.

* * * * *